Feb. 24, 1970    R. D. WAPPLER    3,496,930
CYSTOSCOPE AND DEFLECTABLE OBTURATOR
Filed Oct. 3, 1966
FIG. 1
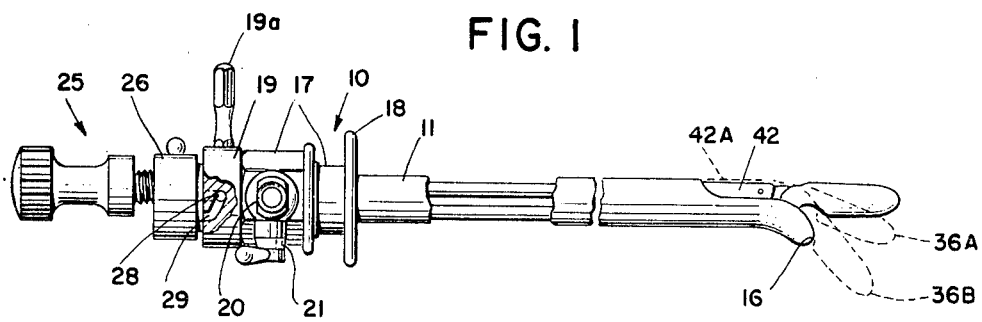
FIG. 2
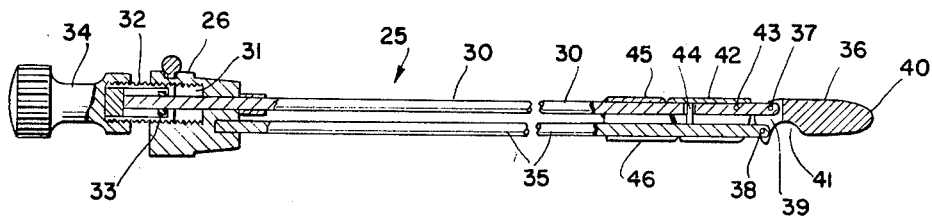
FIG. 3
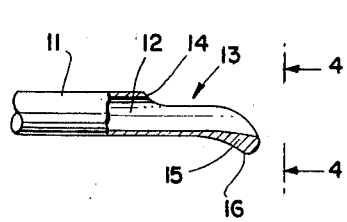
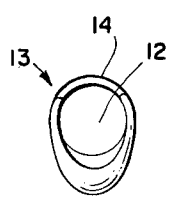
FIG. 4
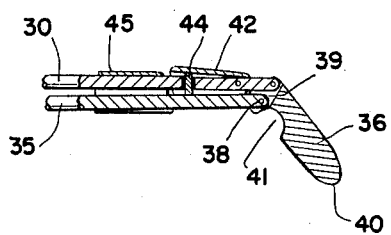
FIG. 5

United States Patent Office 3,496,930
Patented Feb. 24, 1970

3,496,930
CYSTOSCOPE AND DEFLECTABLE OBTURATOR
Reinhold D. Wappler, New York, N.Y., assignor to American Cystoscope Makers, Inc., Pelham Manor, N.Y., a corporation of New York
Filed Oct. 3, 1966, Ser. No. 583,703
Int. Cl. A61b *1/30;* A61m *29/00*
U.S. Cl. 128—5                                    4 Claims

ABSTRACT OF THE DISCLOSURE

An obturator for use in a cystoscopic sheath in which the distal tip of the sheath forms a blunt convexly curved and smoothly merged oblique projection extending laterally of the sheath a distance which is small compared to its width and the obturator includes means for nesting its deflectable tip with the sheath projection to form a smooth solid continuation thereof, these means comprising a concavely curved recess formed in the tip for receiving the projection which has a complementary curvature and means for deflecting the tip into an angulated position in which the projection nests within the recess.

---

This invention relates to a medical instrument for carrying out cystoscopy and more particularly to a cystoscopic sheath and obturator which is especially well suited for the carrying out of endoscopic and related procedures within the urethra of a patient.

The instruments hitherto available to the doctor for carrying out endoscopy in the urethra have left much to be desired, primarily because of a failure to reconcile the conflicting requirements created on the one hand by the desirability of a pronounced angulation of the distal end portion of the instrument to facilitate its insertion, and, on the other hand, by the desirability of a straight sheath for carrying out endoscopy in the prostatic urethra. Straight sheaths have been used with obturators which, when seated in the sheath, provide a projecting distal tip extending at an angle to the sheath. Such instruments have a better shape for insertion than a straight sheath with a straight obturator, but when the obturator is removed from such an instrument, the delicate tissue of the urethra is exposed to the relatively sharp edges and tip formed by the straight walls of the sheath. Efforts to compromise by using a cystoscope sheath having a slightly angulated blunted distal tip have not proven entirely successful because of greater difficulty encountered in inserting the instrument.

It is therefore a principal object of this invention to provide an improved cystoscopic sheath and obturator which together provide an instrument having a pronounced angulation of its distal portion which facilitates insertion of the instrument into the urethra and which, when the obturator is removed, presents a full, unobstructed lumen from end to end as in a straight sheath for endoscopy in the prostatic urethra, but with its distal tip sufficiently blunted so as to minimize disturbance of the tissue of the urethra.

A more specific object is to provide such a cystoscopic sheath and obturator in which the obturator has a blunt tip shaped and movably mounted to coact with the distal tip of the sheath and with the latter forms a blunt angulated tip at the distal end of the instrument. Furthermore, with the obturator removed, the distal end of the sheath has a smoothly curved or biased fenestra and terminates in a slightly angulated convex beak which combines freedom of maneuverability in the prostatic urethra with a minimum of disturbance to the patient.

In accordance with the present invention, a cystoscopic sheath and its deflectable obturator are complementarily constructed so that together they form an instrument having an angulated tip portion the length of which is substantially larger than its width, so as to facilitate insertion of the cystoscope into the urethra, and the sheath, upon removal of the obturator, has an essentially straight external outline except for a short angularity on one side where it terminates in a blunt convex tip. The cystoscopic sheath has a straight lumen terminating in a fenestra at its distal end which is formed on a smooth curved bias to the transverse axis of the sheath, the fenestra extending well back from the distal tip of the sheath so as to provide, in one opening, for straight ahead and lateral visualization or operative procedures. The side of the sheath which forms its extreme distal tip is slightly beaked or angulated and blunted preferably by a smoothly enlarged thickness of its wall. Thus, the extreme distal end portion of the sheath extends at an angle, preferably about 45°, to the remainder of the sheath and terminates in a convexly curved blunt tip. The lateral projection of the tip of the sheath is substantially less than the width of the sheath. In the preferred embodiment of the present invention, as will be more fully described hereinafter, the sheath is ovate in cross section with its width defined by its major transverse axis.

Adjacent their proximal ends, the sheath and obturator are provided with conventional mounting means so that when the obturator is seated in the sheath, the proximal end of the sheath lumen is sealed fluid tight. Extending distally from the obturator mounting means is a pair of support rods to the distal ends of which an elongated obturator tip is pivotally connected. Manually operable means are provided for effective longitudinal displacement of the support rods relative to one another so that the obturator tip is readily shifted to its deflected position. The obturator tip is formed with a convex recess adjacent its proximal end so that when it is shifted to its deflected position, it nests with the complementarily curved beak which forms the distal tip of the sheath and effectively extends the sheath along an acute angle to its axis while at the same time closing the fenestra of the sheath.

Further objects as well as advantages of this invention will be apparent from the following description of a preferred embodiment thereof in conjunction with the accompanying drawing in which FIGURE 1 is a side elevational view of a cystoscope sheath and obturator constructed in accordance with the present invention with the sheath partially broken away and with the partial and fully deflected positions of the obturator shown in broken lines;

FIGURE 2 is a longitudinal cross sectional view of the obturator removed from its sheath;

FIGURE 3 is an elevational view partially in cross section of the distal end portion of the sheath;

FIGURE 4 is an end view of the sheath taken from the point of view indicated by the line 4—4 of FIGURE 3; and FIGURE 5 is a cross sectional view of the distal portion of the obturator shown in FIGURE 2, but with the obturator tip shifted to its fully deflected position.

Turning now to the drawing, the cystoscope sheath assembly 10 comprises an elongated tubular sheath 11 having a straight lumen 12 and which is preferably ovate in cross section as is most clearly shown in FIGURE 4. At its distal end, sheath 11 terminates in a fenestra 13 formed on the bias, that is, at an angle to the major transverse axis of the sheath and extending back along the sheath 11 to its proximal end indicated at 14. The downwardly presented side of the sheath, as shown in the drawing, is gradually enlarged in thickness at its distal tip to form a lateral projection 15 which is short compared to the width of the sheath. The surface 16 of the projection 15 is smoothly convexly curved and merges smoothly with the remaining distal end walls of the sheath forming the fenestra 13. Projection 15 forms a beak at the distal end of the sheath which blunts the tip, yet is not so bulky as to interfere to any significant extent with manipulation of the sheath in the prostatic urethra.

At its proximal end, the sheath assembly 10 comprises a block 17 carrying a larger diameter collar 18. Sheath 11 extends through collar 18 and is secured to block 17 in a suitable manner such as by soldering or brazing when, as shown, the block and sheath are formed of metal. Conventional mounting means are also provided at the proximal end of the sheath assembly 10 for mounting the obturator yet to be described. The preferred form of mounting means shown in the drawing is a conventional bayonet type mounting which, on the sheath assembly 10, includes the enlarged proximal end of the block 17 and a lock ring 19 rotatably mounted thereon. The block 17 may also be provided as shown with conduits 20 (only one of which is shown in the drawing), each controlled by a valve 21 for introducing and/or removing fluids from the sheath 11.

Obturator 25 adjacent its proximal end comprises mounting means which includes a block 26 having its distal portion 27 conically tapered to mate in fluid tight relation with the conical interior of sheath block 17. A pair of pins 28, only one of which is shown in FIGURE 1, are engaged in slots 29 formed in lock ring 19 so that rotation of ring 19 by means of its lever 19A serves to lock the obturator block 26 in sealed relation within the sheath block 17, as is well known in the art.

The block 26 has a bore formed therethrough in which a first elongated rod 30 is slidably mounted. A counterbore 31, formed in the block 26, is tapped to receive a threaded hollow stud 32 rotatably fixed on the proximal end portion of rod 30, the latter carrying a ring 33 to ensure that it is advanced and retracted as stud 32 is threaded into and out of the block 26. A knurled knob 34 is fixed to stud 32 by which the latter is readily manually rotated in use. A second elongated rod 35 extends from the distal end of block 26 and is fixed thereto so that it extends alongside of (below, as shown in the drawing) the first rod 30.

An obturator tip 36 is pivotally connected by pins 37 and 38 to the ends of each of the rods 30 and 35, respectively, the tip 36 being formed with a slot 39 formed in its proximal end to receive the distal end portions of the rods. Obturator tip 36 is formed with a bluntly curved distal end portion 40 and has a recess 41 formed in the surface thereof adjacent to where it is connected to rod 35. The curvature of the recess 41 closely conforms to that of the convexly curved surface 16 of the projection 15 on the distal end of sheath 11. For the major part of its length, the obturator tip 36 is ovate in cross section and is so dimensioned as to form a smooth, solid continuation of sheath 11.

As is clearly shown in the drawing, obturator tip 36, when in place, provides a closure for the distal or forwardly presented portion of fenestra 13. Means also may be provided to close the laterally presented portion of fenestra 13 and preferably this is accomplished by means of a sleeve 42 which is generally U-shaped in cross section, and is pivotally connected adjacent its distal end to rod 30 by means of a pin 43. Adjacent to its proximal end, the sleeve 42 carries a pin 44 which loosely extends through a hole formed in the rod 30 and engages the upwardly presented surface of fixed rod 35. If desired, a second sleeve may also be provided which is fixed to movable rod 30 and which has a channel 46 extending therethrough that is U-shaped in cross section. Rod 35 extends through the channel 46, the dimensions of the latter being such as to permit free displacement of rod 30 and sleeve 45 relative to rod 35.

With obturator 25 seated and locked in place within the sheath assembly 10, rotation of knob 34 in the direction to thread stud 32 into block 26 serves to advance rod 30 to the right (as viewed in the drawing) and displaces the movable pivot 37 and obturator tip 36 about the fixed pivot 38. An intermediate position of the obturator tip 36 is indicated in dotted line at 36A in FIGURE 1, while its fully deflected position is indicated at 36B in FIGURE 1. With the obturator tip 36 in its fully deflected position 36B (FIGURE 1), sheath projection 15 is seated within the recess 41 and the obturator tip 36, cooperating with the projection 15, forms an elongated beak extending at an angle of about 45° to the longitudinal axis of the sheath 11. It is to be noted that movement of the pivot 37 about the fixed pivot 38 carries the distal end of rod 30 toward fixed rod 35. Pin 44, being in engagement with the rod 35, serves to tilt the shield 42 about its pivot pin 43 to the position shown most clearly in FIGURE 5, and indicated by dashed lines at 42A in FIGURE 1 in which a portion of the proximal end of sleeve 42 is aligned with the portion of sheath 11 forming the proximal edge 14 of fenestra 13.

In use, the instrument is inserted through the urethra into the bladder with the obturator fully deflected, as was described. When the instrument has been properly positioned, knob 34 is readily rotated to return the obturator tip 36 to its undeflected position in alignment with the lumen 12 of sheath 11. The accompanying movement of rod 30 to the left, as viewed in the drawing, and its displacement away from fixed rod 35, leaves sleeve 42 free to be returned to its normal position in alignment with sleeve 45 by the portion 14 of the sheath. The obturator is then removed from the sheath 11, leaving the lumen 12 and fenestra 13 unobstructed for the carrying out of medical procedures in the bladder either straight ahead or to the side of the fenestra 13. The instrument is readily withdrawn to carry its fenestra 13 into the urethra for the carrying out of desired medical procedures.

I claim:

1. An instrument suitable for insertion into and for carrying out medical procedures within the prostatic urethra and the bladder, comprising a tubular sheath forming a straight lumen terminating in a fenestra at its distal end, said sheath having a wall portion of enlarged thickness at its distal tip forming a blunt convexly curved oblique projection extending laterally a distance which is small compared to the width of said sheath, mounting means connected to the proximal end of said sheath for removably mounting selected devices in said sheath, the exterior of said sheath throughout its length between said mounting means and said oblique projection being substantially straight, the portion of said sheath forming said oblique projection merging smoothly with the distal edge portion of said sheath defining said fenestra, obturator means including an elongated obturator tip removably mountable in said sheath with said obturator tip obstructing and projecting beyond said fenestra, said obturator tip having a concavely curved recess formed in one side thereof, the curvature of which is complementary to the curvature of said oblique projection, said obturator means further including means for displacing said obturator tip between two extreme positions, said obturator tip in one of its said positions extending with its longitudinal axis substantially aligned with the longitudinal axis of said lumen, and said obturator tip in the other of its said extreme positions extending obliquely to said longitudinal axis with said oblique projection nested in said recess, said obturator means also including a mounting block adjacent its proximal end having a bore formed therethrough, an elongated movable rod slidably mounted in said bore and extending from said mounting block toward the distal end of said obturator means, rotatable means mounted on said mounting block and rotatably connected to the proximal end of said movable rod, said movable rod adjacent its distal end being pivotally connected to the proximal end of said obturator tip, a second elongated rod connected at its proximal end to said mounting block and pivotally connected adjacent its distal end to the proximal end of said obturator tip adjacent said recess, said sheath fenestra extending obliquely partially across said sheath substantially in alignment with said oblique projection and extending longitudinally toward the proximal end of said sheath for a distance which is short compared to the length of said sheath, and said obturator means further including a sleeve connected to said movable rod and extending therealong from adjacent said obturator tip toward the proximal end of said obturator means, means for displacing said sleeve so that when said obturator tip is in the other of its said extreme positions, the proximal end of said sleeve is in alignment with the portion of said sheath forming the proximal end of said fenestra, and the length of said sleeve being substantially equal to the longitudinal length of said fenestra so that said sleeve smoothly closes the laterally presented portion of said fenestra, said sleeve adjacent its distal end being pivotally connected to said movable rod, and said sleeve displacing means comprises a pin connected to said sleeve adjacent to its proximal end and extending, through a hole formed in said movable rod, into engagement with said second rod.

2. An instrument suitable for insertion into and for carrying out medical procedures within the prostatic urethra and the bladder, comprising a rigid endoscopic sheath having a straight lumen therethrough terminating in a fenestra at its distal end and a wall portion of enlarged thickness at such end forming a blunt convexly curved and smoothly merged oblique projection extending laterally of the sheath a distance which is small compared to the width thereof, an obturator removably mounted in said sheath and having an elongated rigid tip deflectable between a straight and a fully angulated position with respect to said sheath, said tip having a recess therein comprising a permanent surface indentation which facilitates nesting of the oblique projection with said tip to form a smooth solid continuation of said projection when said tip is in said fully angulated position, and means for deflecting said tip into said fully angulated position in which said projection nests within said recess.

3. An instrument according to claim 2 in which the recess in the obturator tip has a concave curvature which complements the curvature of the sheath projection which nests within it and said tip is ovate in cross-section.

4. An instrument for insertion into and carrying out medical procedures within the prostatic urethra and the bladder comprising in combination a rigid endoscopic sheath having an open distal end and a wall portion of enlarged thickness at such end forming a blunt convexly curved and smoothly merged projection extending laterally of the sheath a distance which is small compared to the width thereof and an obturator removably mounted within said sheath having an elongated rigid tip deflectable between a straight and an angulated position within said sheath, said tip having a recess comprising a permanent surface indentation and nesting of the oblique projection with said tip to form a smooth solid continuation thereof, and means for deflecting said tip into an angulated position in which said projection nests within said recess.

References Cited
UNITED STATES PATENTS

| | | | |
|---|---|---|---|
| 1,267,066 | 5/1918 | Flack | 128—345 XR |
| 1,453,975 | 5/1923 | Greenberg et al. | 128—7 |
| 1,770,653 | 7/1930 | Molony | 128—303.17 |
| 2,076,741 | 4/1937 | Peck | 128—4 |
| 2,079,233 | 5/1937 | Wappler | 128—7 |
| 2,584,619 | 2/1952 | Rubens et al. | 128—5 |
| 2,907,321 | 10/1959 | Rubens | 128—7 |
| 3,144,020 | 8/1964 | Zingale | 128—4 |
| 3,314,431 | 4/1967 | Smith | 128—341 XR |
| 3,326,208 | 6/1967 | Held | 128—7 |

RICHARD A. GAUDET, Primary Examiner

K. L. HOWELL, Assistant Examiner

U.S. Cl. X.R.

128—345